United States Patent
Das et al.

(10) Patent No.: US 7,832,687 B1
(45) Date of Patent: Nov. 16, 2010

(54) ON-ORBIT STORAGE, PLANE CHANGE, AND INJECTION TO FINAL ORBIT OF SPACE VEHICLES

(75) Inventors: Aniruddha Das, King of Prussia, PA (US); Herbert H. Vichnin, King of Prussia, PA (US); Brenton B. Achee, Chester Springs, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 12/493,124

(22) Filed: Jun. 26, 2009

Related U.S. Application Data

(62) Division of application No. 11/206,908, filed on Aug. 19, 2005, now abandoned.

(60) Provisional application No. 60/603,562, filed on Aug. 24, 2004.

(51) Int. Cl.
   *B64G 1/10* (2006.01)
(52) U.S. Cl. .................................. 244/158.5
(58) Field of Classification Search ... 244/158.4–158.6, 244/169
   See application file for complete search history.

(56) References Cited

U.S. PATENT DOCUMENTS

| 4,288,051 | A | 9/1981 | Goschel |
| 5,199,672 | A | 4/1993 | King et al. |
| 5,595,360 | A | 1/1997 | Spitzer |
| 5,716,029 | A | 2/1998 | Spitzer et al. |
| 5,961,077 | A | 10/1999 | Koppel et al. |
| 6,286,787 | B1 | 9/2001 | Fleeter |
| 6,364,252 | B1 | 4/2002 | Anderman |

*Primary Examiner*—Tien Dinh
(74) *Attorney, Agent, or Firm*—McDermott Will & Emery LLP

(57) ABSTRACT

Methods are described for launching multiple space vehicles. A first space vehicle and a second space vehicle can be detachably attached to a launch vehicle. The first space vehicle is for an orbit of a first desired altitude in a first desired orbital plane. The second vehicle is for an orbit of a second desired altitude in a second desired orbital plane. The launch vehicle with the first and second space vehicles may be launched into a first orbit in or near the first desired orbital plane. The second space vehicle may be released in the first orbit. When the orbital plane of the second space vehicle coincides with the second desired orbital plane, the second space vehicle may be transferred to a transfer orbit. The second space vehicle may be transferred to the orbit of the second desired altitude in the second desired orbital plane.

20 Claims, 4 Drawing Sheets

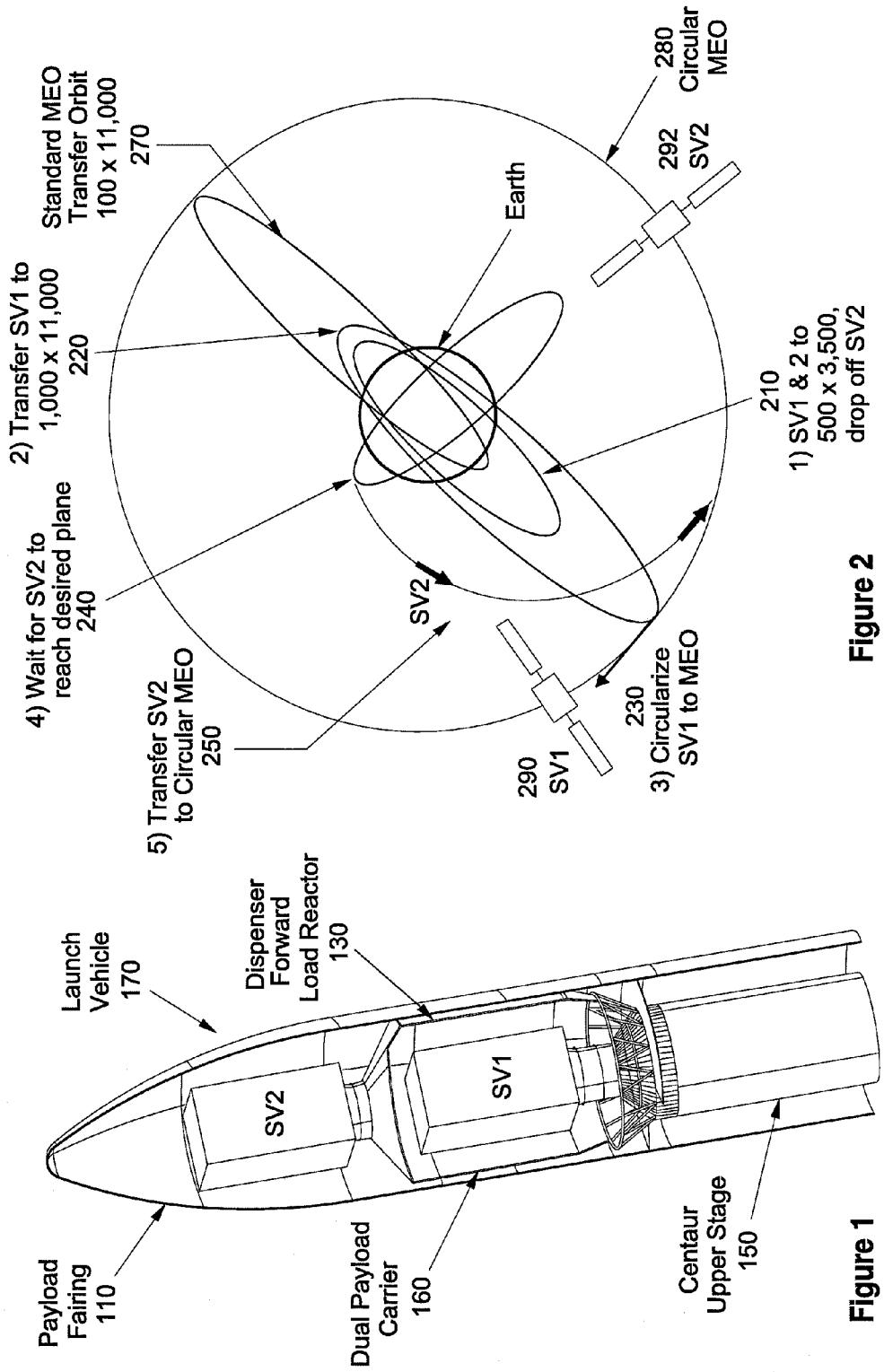

| Perigee nmi | Apogee nmi | Period min | Inclination deg | Node Rate deg/day | Arg Perigee Rate deg/day |
|---|---|---|---|---|---|
| 100 | 11,000 | 382 | 39 | -0.66 | 0.876 |
| 1,000 | 5,000 | 215 | 39 | -1.05 | 1.376 |
| 1,000 | 11,000 | 382 | 39 | -0.4396 | 0.571 |
| 1,000 | 11,000 | 382 | 63.5 | -0.2525 | -0.0005 |
| 1,000 | 5,000 | 215 | 63.5 | -0.608 | -0.002 |
| 100 | 11,000 | 382 | 63.5 | -0.338 | -0.002 |
| 5,000 | 5,000 |  | 39 | -0.336 | undefined |
| 1,000 | 5,000 | 215 | 55 | -0.782 | 0.441 |
| 1,000 | 4,000 | 191 | 55 | -0.9662 | 0.545 |
| 500 | 5,500 | 215.7 | 55 | -0.885 | 0.499 |
| 500 | 4,500 | 191.1 | 55 | -1.077 | 0.0607 |
| 500 | 3,500 | 167.6 | 55 | -1.349 | 0.760 |

Figure 3

| Scenario | SV1 and SV2 Injection Weight (lb) | Maneuver Profile ($h_p \times h_a$ nmi) | SV1 Launch Weight (lb) | SV2 Launch Weight (lb) | Stack Weight (lb) |
|---|---|---|---|---|---|
| 8 | 3100 | SV2: 500 x 5500 to 500 x 11000 to GPS MEO | 4515 | 5568 | 11582 |
| 8a | 2937 | SV2: 500 x 5500 to 500 x 11000 to GPS MEO | 4277 | 5275 | 11052 |
| 9 | 3100 | SV2: 500 x 4500 to 500 x 11000 to GPS MEO | 4515 | 5856 | 11871 |
| 9a | 2937 | SV2: 500 x 4000 to 500 x 11000 to GPS MEO | 4277 | 5548 | 11325 |
| 10 | 3100 | SV2: 500 x 3500 to 500 x 11000 to GPS MEO | 4515 | 6225 | 12240 |
| 10a | 2937 | SV2: 500 x 3500 to 500 x 11000 to GPS MEO | 4277 | 5898 | 11676 |

Figure 4

ON-ORBIT STORAGE, PLANE CHANGE, AND INJECTION TO FINAL ORBIT OF SPACE VEHICLES

CROSS-REFERENCES TO RELATED APPLICATIONS

This application is a divisional application of U.S. patent application Ser. No. 11/206,908 entitled, "On-Orbit Storage, Plane Change, and Injection to Final Orbit of Space Vehicles," filed Aug. 19, 2005, which claims the benefit of priority under 35 U.S.C. §119 from U.S. Provisional Patent Application No. 60/603,562, filed Aug. 24, 2004, entitled "Improved On-Orbit Storage, Plane Change, and Injection to Final Orbit of Space Vehicles," all of which are hereby incorporated by reference in their entirety for all purposes.

STATEMENT REGARDING FEDERALLY SPONSORED RESEARCH OR DEVELOPMENT

NOT APPLICABLE

FIELD

The disclosure generally relates to space vehicles and, in particular, relates to launching multiple space vehicles simultaneously, to reduce cost.

BACKGROUND

One of the major problems faced by the satellite industry is the high cost of launching space vehicles. Since space vehicles are typically launched individually, launch costs increase quickly when the deployment of multiple space vehicles is required.

Conventionally, the problem of launching multiple different space vehicles in two different missions, orbital planes and altitudes has been solved by launching the two space vehicles in two different launch vehicles. Since the launch costs for a single launch vehicle exceed $100M, the conventional approach would cost more than $200M for two launches.

Mindful of the high expense of individually launching multiple space vehicles, it is considered highly desirable to provide for a method for inexpensively launching multiple space vehicles together, sharing the overall launch costs amongst several space vehicles.

SUMMARY

The high cost of launching multiple space vehicles can be reduced if expenses are shared by multiple space vehicles. According to an aspect of the disclosure, multiple space vehicles can be launched in one launch vehicle. The present invention provides a method of sharing one launch vehicle by multiple space vehicles that could be in the same or different constellation. Accordingly, multiple space vehicles that are to be launched in the same launch vehicle could be either parts of the same constellation (e.g., the global positioning system ("GPS") constellation) or parts of different constellations.

The disclosure also provides a method of sharing one launch vehicle by multiple space vehicles that could be in the same or multiple orbital planes or at the same or different orbital altitudes and positions. Accordingly, multiple space vehicles that are to be launched in the same launch vehicle could be either parts of the same or different orbital planes. In addition, multiple space vehicles that are to be launched in the same launch vehicle could be at the same or different orbital altitudes or positions.

Using the launch approach of the present disclosure, the total launch cost for deploying two space vehicles in two different missions, orbital planes and altitudes would be, for example, approximately $100M, a savings of over $100M per dual launch using the conventional launch technique. This large savings is possible due to the innovative use of asymmetry of the gravitational forces of the earth that allows low-earth orbits ("LEOs") to regress around the earth. This allows widely separated orbital planes to be serviced by a single launch vehicle.

The present disclosure provides methods and systems for launching multiple space vehicles using one launch vehicle. A first space vehicle and a second space vehicle can be attached to the launch vehicle directly or indirectly. Each of the first and second space vehicles is detachable from the launch vehicle. The first space vehicle is for a final orbit with a first desired altitude in a first desired orbital plane. The second vehicle is for a final orbit with a second desired altitude in a second desired orbital plane. The final desired orbital plane of the first space vehicle is different from the final desired orbital plane of the second space vehicle. The first desired altitude can be either substantially the same as or different from the second desired altitude.

In accordance with one embodiment of the present disclosure, the launch vehicle with the first and second space vehicles is launched into a first orbit. The second space vehicle is then released from the launch vehicle while the first space vehicle is still attached to the launch vehicle, directly or indirectly. The first orbit is preferably a low earth orbit. The first orbit may be in the first desired orbital plane or near the first desired orbital plane.

The second space vehicle may be released in the first orbit. The first orbit may be characterized by a first perigee altitude and a first apogee altitude. The first perigee altitude and the first apogee altitude are determined on the basis of the capabilities of the launch vehicle, the capabilities of the second space vehicle, and an orbital regression rate appropriate for inserting the second space vehicle into the second desired orbital plane.

In accordance with one embodiment, the launch vehicle without the second space vehicle is transferred into a second orbit, and the first space vehicle is released in this second orbit. The second orbit is characterized by a second perigee altitude and a second apogee altitude, where the second perigee altitude is determined on the basis of the capabilities of the launch vehicle and the first space vehicle. The second apogee altitude is substantially the same as the first desired altitude. In another embodiment, the second orbit is substantially the same as the first orbit.

In accordance with one embodiment, the first space vehicle is transferred substantially into the final orbit with the first desired altitude substantially in the first desired orbital plane by, for example, firing a rocket engine at a predetermined point in an orbit of the first space vehicle.

The second space vehicle is then transferred into a third orbit by, for example, firing a rocket engine when an orbital plane of the second space vehicle coincides with the second desired orbital plane. The second space vehicle is finally transferred substantially into the final orbit with the second desired altitude substantially in the second desired orbital plane by, for example, firing a rocket engine at a predetermined point in an orbit of the second space vehicle.

In one aspect of the disclosure, a method is described for launching a first space vehicle and a second space vehicle. The first space vehicle may be designed to carry out its own mission in a first final destination orbit in a first final destination orbital plane and may have its own one or more first rocket engines. The second space vehicle may be designed to carry out its own mission in a second final destination orbit in a second final destination orbital plane and may have its own one or more second rocket engines.

The method may include determining a first orbit having a first perigee altitude and a first apogee altitude, into which the launch vehicle is to be launched and where the second space vehicle is to be released. The determination may be based on an orbital regression rate of the second space vehicle to insert the second space vehicle from the first final destination orbital plane into the second final destination orbital plane, based on perturbations produced by an oblateness of the earth, without utilizing a launch vehicle or the one or more second rocket engines of the second space vehicle.

The method may include launching the launch vehicle with the first and second space vehicles into the first orbit in the first final destination orbital plane of the first space vehicle and releasing the second space vehicle from the launch vehicle, in the first orbit in the first final destination orbital plane, while the first space vehicle is attached to the launch vehicle.

The method may include determining when an orbital plane of the second space vehicle coincides with the second final destination orbital plane of the second space vehicle, and transferring the second space vehicle from the first final destination orbital plane to the second final destination orbital plane, without utilizing the launch vehicle or the one or more second rocket engines of the second space vehicle.

The method may include firing the one or more second rocket engines of the second space vehicle, when the second space vehicle is in the second final destination orbital plane, to achieve a transfer orbit. The method may include determining when to fire the one or more second rocket engines of the second space vehicle to achieve the second final destination orbit and firing the one or more second rocket engines of the second space vehicle at a time determined to achieve the second final destination orbit.

The method may include performing, by the second space vehicle, its own mission at the second final destination orbit in the second final destination orbital plane. The first final destination orbital plane may be different from the second final destination orbital plane.

The foregoing summary of the disclosure has been provided so that the nature of the invention can be understood quickly. A more detailed and complete understanding of the embodiments of the disclosure can be obtained by reference to the following detailed description of the disclosure together with the associated drawings.

BRIEF DESCRIPTION OF THE DRAWINGS

FIG. 1 is a simplified diagram of a launch vehicle with two space vehicles in accordance with one embodiment of the present disclosure.

FIG. 2 illustrates an exemplary technique of launching multiple space vehicles into two different orbital planes using an evolved-expendable launch vehicle in accordance with one embodiment of the present disclosure.

FIG. 3 illustrates exemplary perigee altitude values and apogee altitude values that may be used in accordance with one embodiment of the present disclosure.

FIG. 4 illustrates exemplary scenarios as to how to achieve a desired orbit of a space vehicle.

DETAILED DESCRIPTION

Figure 5:
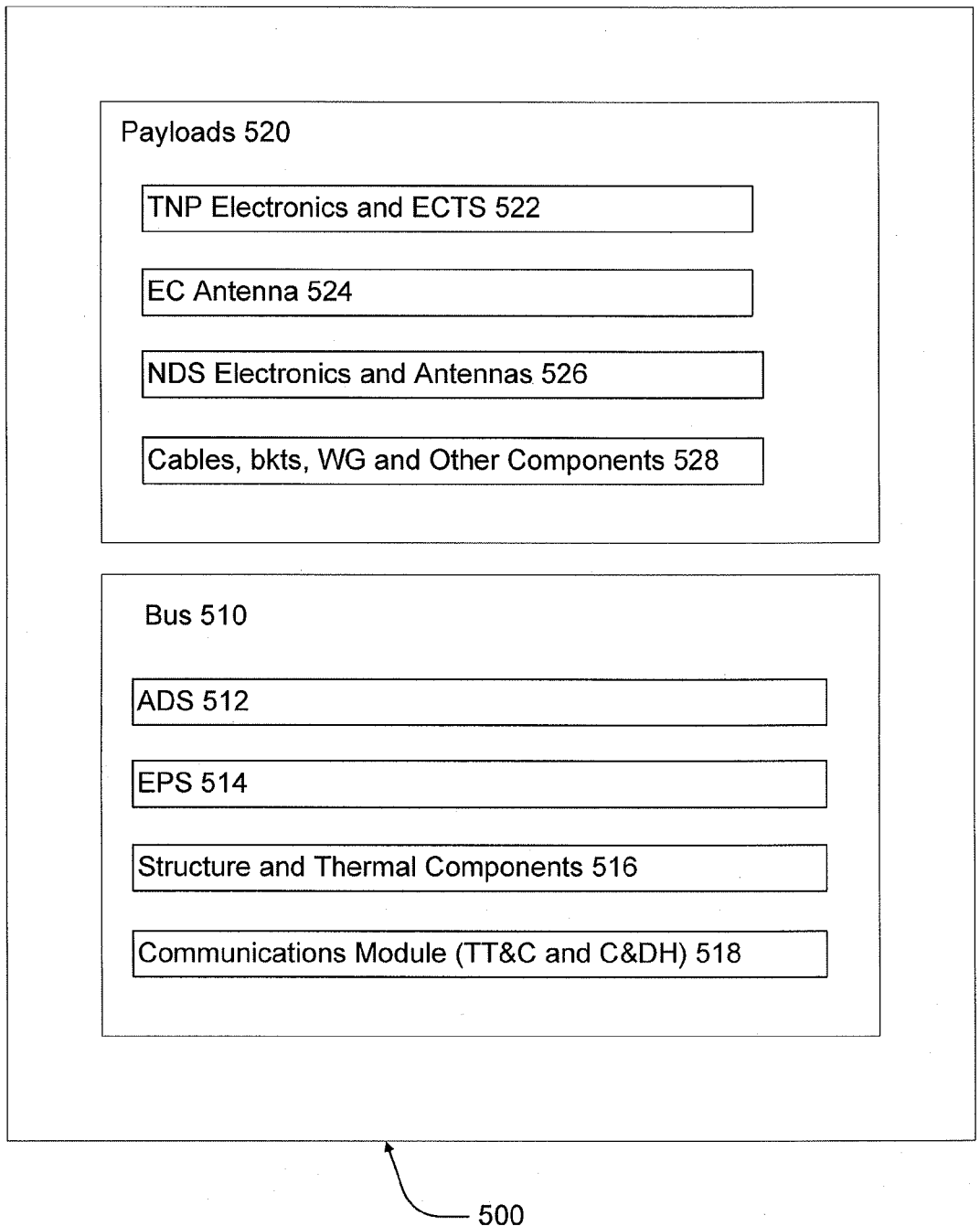
FIG. 5 illustrates a simplified diagram of a vehicle in accordance with one aspect of the present disclosure.

In accordance with one embodiment of the present disclosure, two space vehicles may be launched using one launch vehicle ("LV"). Now referring to FIG. 1, a space vehicle system includes a launch vehicle 170, a space vehicle SV1, and a space vehicle SV2 in accordance with one embodiment of the present disclosure. The space vehicle system further includes a payload fairing 110, a dispenser forward load reactor 130, a dual payload carrier 160, and a centaur upper stage 150. The payload fairing 110 is a covering for protecting the entire payload system (i.e., SV1, SV2 and the dual payload carrier 160). The dual payload carrier carries SV2. The centaur upper stage 150 includes rockets. SV1 is detachably attached to the centaur upper stage 150. The dual payload carrier 160 is placed around SV1. SV2 is detachably attached to the dual payload carrier 160. The payload fairing 110 covers SV1, SV2 and the dual payload carrier. To release SV1, the dispenser forward load reactor 130 opens the dual payload carrier 160, and SV1 is released. In another embodiment, SV1 and SV2 may be placed side-by-side.

Now referring to FIG. 2, in accordance with one embodiment of the present disclosure, there are two SVs (SV1 and SV2) sharing a single LV for two different missions. In particular, assume SV1 supports the primary mission in an orbit with an average altitude of A1 nautical miles in a desired orbital plane P1. SV2 supports a secondary mission in an orbit with an average altitude of A2 nautical miles in a desired orbital plane P2. The two SVs are to be mounted on the LV in a manner such that SV2 can be deployed while SV1 is still mounted on the LV. The masses of the two SVs are such that the LV is capable of performing the sequence of orbital maneuvers described below. An orbit of the present disclosure can be any shape (e.g., elliptic or circular). If an orbit is circular, then a perigee altitude and an apogee altitude of the orbit will be the same.

Maneuver 1 (210): The LV is launched into a low earth orbit ("LEO"), e.g., an orbit with a perigee altitude of A3 nautical miles and an apogee altitude of A4 nautical miles, in the orbital plane, P1, desired by SV1. SV2 is released in this LEO. The parameters A3 and A4 are chosen from the capabilities of the LV and SV2 and the orbital regression rate desired for the insertion of SV2 into its desired orbital plane, P2.

Maneuver 2 (220): The LV achieves a new transfer orbit characterized by a perigee altitude of A5 nautical miles and an apogee altitude of A1 nautical miles. SV1 is released in this orbit. A5 is chosen from the capabilities of the LV and SV1. In another embodiment, SV1 may be released in the orbit achieved during maneuver 1 (e.g., the LEO). In that case, SV2 and SV1 will be released at different times so that the two SVs do not collide with each other.

Maneuver 3 (230): At a predetermined point in its orbit, SV1 fires its propulsive rocket engines to achieve its desired orbit of altitude A1 in the orbital plane P1. Meanwhile SV2 and its orbital plane continue to regress around the earth in accordance with the perturbations produced by the oblateness of the earth.

Maneuver 4 (240): When the orbital plane of SV2 coincides with the orbital plane P2, the desired orbital plane of SV2, the rocket engines of SV2 are fired to achieve a transfer orbit characterized by a perigee altitude of A3 nautical miles and an apogee altitude of A2 nautical miles.

Maneuver 5 (250): At a predetermined point in its orbit, SV2 fires its propulsive rocket engines to achieve its desired orbit of altitude A2 in the orbital plane P2.

In another embodiment, SV1 may fire its propulsive rocket engines at multiple predetermined points to achieve its desired orbit of altitude A1 in the orbital plane P1. In addition, SV2 may fire its rocket engines multiple times to achieve a transfer orbit. SV2 may also fire its rocket engines multiple times to achieve its desired orbit of altitude A2 in the orbital plane P2.

In FIG. 2, the exemplary values chosen for A1, A2, A3, A4, and A5 are 11,000, 11,000, 500, 3500, and 1000 nautical miles, respectively. The values for A1, A2, A3, A4, and A5 are not limited to these values, and they may have different values in another embodiment. In this example, A1 and A2 are the same (i.e., the orbits of the desired altitudes of SV1 and SV2 are the same), but they may be different in another embodiment. A1 and A2 can be any number. In FIG. 2, SV1 and SV2 are in the same medium earth orbit ("MEO") at an altitude of 11,000 nautical miles, but they are in different orbital planes. In another embodiment, SV1 and SV2 may be in different orbits having different altitudes. The desired orbit for each of SV1 and SV2 may be any orbit (e.g., any of a LEO, MEO, or geosynchronous earth orbit ("GEO")).

In FIG. 2, the desired orbits for SV1 and SV2 are circular in this example, but in another embodiment, each of the desired orbits may be of a different shape. FIG. 2 also shows a standard MEO transfer orbit 270 characterized by a perigee altitude of 100 nautical miles and an apogee altitude of 11,000 nautical miles.

According to one embodiment of the present disclosure, the weight of SV1 and the weight of SV2 may be used as a factor in calculating the parameters A1, A2, A3, A4, and A5. A space vehicle may weigh, for example, 2,936.8 pounds, where the dry weight (without the fuel) is 2,685.6 pounds, and the weight of the fuel is 251.2 pounds.

FIG. 3 illustrates how a space vehicle such as SV2 may move or regress around the earth for a given perigee altitude (A3) and a given apogee altitude (A4) in accordance with one embodiment of the present disclosure. Column 310 refers to various perigee altitudes (A3), and column 320 refers to various apogee altitudes (A4). Column 330 refers to a period (in minutes) needed to go around an orbit once for a given perigee altitude and apogee altitude. Column 340 refers to an inclination of the orbit with respect to the equator of the earth for a given perigee altitude and apogee altitude. Column 350 refers to a rate at which an orbit of SV2 would regress around the earth for a given perigee altitude and apogee altitude. Column 360 refers to an average rate at which a perigee moves in an orbit because the earth is not perfectly round.

SV2 may move or regress around the earth at different rates. For example, in row 370, the perigee altitude and the apogee altitude are 1,000 and 5,000 nautical miles, respectively, and the node rate is −1.05 deg/day. If it is desired to transfer SV2 into an orbital plane that is 105 degrees away from the original plane, it will take 100 days to achieve this change (i.e., 1.05 deg/day×100 days=105 degrees). Firing of the rocket engines during maneuvers 4 and 5 in FIG. 2 depends on the values in columns 340 and 360 and A2 (the average desired altitude of SV2).

FIG. 4 illustrates exemplary scenarios as to how to achieve a desired orbit of a space vehicle such as SV2. Column 410 refers to various scenario numbers. Column 420 refers to the weight of SV1 and the weight of SV2 after they are finally placed into their respective desired orbits (i.e., after maneuver 5 in FIG. 2). The weights do not include the weight of the fuel. Column 430 shows the various maneuver profiles of SV2. In column 430, $h_p$ is the perigee altitude in nautical miles, and $h_a$ is the apogee altitude in nautical miles. The first two numbers (e.g., 500 and 5500 for scenario 8) refer to A3 and A4. The second two numbers (e.g., 500 and 11000) refer to A3 and A2.

In FIG. 4, the desired orbit of SV2 is a GPS MEO, and that is the final orbit for SV2. Column 440 is the weight of SV1 with fuel prior to its launch (prior to maneuver 1 in FIG. 2). Column 450 is the weight of SV2 with fuel prior to its launch (prior to maneuver 1 in FIG. 2). Column 460 is the sum of the values in columns 440 and 450 and the weight of a dual payload carrier.

To achieve a maneuver profile of SV2 shown in column 430 of FIG. 4, one would use the various weights shown in columns 440, 450, and 460. For example, in scenario 8, it is desired (i) to launch SV2 into an orbit characterized by a perigee altitude of 500 nautical miles (A3) and an apogee altitude of 5,500 nautical miles (A4), then (ii) to transfer SV2 into an orbit characterized by a perigee altitude of 500 nautical miles (A3) and an apogee altitude of 11,000 nautical miles (A2), and then (iii) to transfer SV2 into a final MEO orbit at the altitude of 11,000 nautical miles (A2). To achieve this maneuver profile, the pre-launch weight of SV1 with fuel is 4,515 lbs, the pre-launch weight of SV2 with fuel is 5,568 lbs, and the stack weight is 11,582 lbs.

FIG. 5 illustrates a simplified diagram of a vehicle in accordance with one aspect of the present disclosure. A vehicle 500 may be a space vehicle including bus 510 and payloads 520. Bus 510 may include an ADS (attitude determination subsystem) 512 for performing attitude determination. Bus 510 may include an EPS (electrical power subsystem) 514. Bus 510 may include structural and thermal components 516. Bus 510 may include a communications module 518 having TT&C (telemetry tracking & command) and C&DH (command and data handling) for performing telemetry tracking and command and for performing command and data handling.

Payloads 520 may include TNP (total navigation payload) electronics and ECTS (enhanced crosslinked transponder system) 522 for performing navigation and for performing communication. Payloads 520 may include an EC Antenna (earth coverage antenna) 524 for performing communication. Payloads 520 may also include NDS (nuclear detonation detection system) electronics and antennas 526. The NDS may be used for performing nuclear detonation detection. Payloads 520 may include cables, brackets, waveguides and other components 528.

The foregoing detailed description of the disclosure is intended to illustrate exemplary embodiments of the disclosure. However, the examples set forth above are not intended to limit the scope of the invention, which should be interpreted using the claims provided below. It is to be understood that various modifications to the illustrated examples of the disclosure can be made without departing from the spirit and scope of the invention.

What is claimed is:

1. A method for launching a single first space vehicle and a single second space vehicle, the first space vehicle designed to carry out its own mission in a first final destination orbit in a first final destination orbital plane and having its own one or more first rocket engines, the second space vehicle designed to carry out its own mission in a second final destination orbit in a second final destination orbital plane and having its own one or more second rocket engines, the method comprising:

determining a first orbit having a first perigee altitude and a first apogee altitude, into which the launch vehicle is to be launched and where the second space vehicle is to be released, based on an orbital regression rate of the second space vehicle to insert the second space vehicle from the first final destination orbital plane into the second final destination orbital plane, based on perturbations produced by an oblateness of the earth, without utilizing a launch vehicle or the one or more second rocket engines of the second space vehicle;

launching the launch vehicle with the first and second space vehicles into the first orbit in the first final destination orbital plane of the first space vehicle;

releasing the second space vehicle from the launch vehicle, in the first orbit in the first final destination orbital plane, while the first space vehicle is attached to the launch vehicle;

determining when an orbital plane of the second space vehicle coincides with the second final destination orbital plane of the second space vehicle;

transferring the second space vehicle from the first final destination orbital plane to the second final destination orbital plane, without utilizing the launch vehicle or the one or more second rocket engines of the second space vehicle;

firing the one or more second rocket engines of the second space vehicle, when the second space vehicle is in the second final destination orbital plane, to achieve a transfer orbit;

determining when to fire the one or more second rocket engines of the second space vehicle to achieve the second final destination orbit;

firing the one or more second rocket engines of the second space vehicle at a time determined to achieve the second final destination orbit; and performing, by the second space vehicle, its own mission at the second final destination orbit in the second final destination orbital plane, wherein the first final destination orbital plane is different from the second final destination orbital plane.

2. The method of claim 1, further comprising:
releasing the first space vehicle from the launch vehicle, in a second orbit in the first final destination orbital plane.

3. The method of claim 2, further comprising:
firing the one or more first rocket engines of the first space vehicle to achieve the first final destination orbit in the first final destination orbital plane.

4. The method of claim 3, further comprising:
performing, by the first space vehicle, its own mission at the first final destination orbit in the first final destination orbital plane.

5. The method of claim 3, wherein the firing of the one or more first rocket engines is performed before completing the transferring of the second space vehicle to the second final destination orbital plane, and
wherein the first space vehicle achieves the first final destination orbit in the first final destination orbital plane before the second space vehicle is transferred to the second final destination orbital plane.

6. The method of claim 3, wherein the firing of the one or more first rocket engines is performed during the transferring of the second space vehicle from the first final destination orbital plane to the second final destination orbital plane.

7. The method of claim 2, wherein the second orbit is characterized by a second perigee altitude and a second apogee altitude, and
wherein the method further comprises:
determining the second perigee altitude based on capabilities of the launch vehicle and capabilities of the first space vehicle;
selecting the second apogee altitude that is substantially the same as the first final destination orbit; and
transferring the launch vehicle into the second orbit prior to completing the step of releasing the first space vehicle.

8. The method of claim 3, wherein the firing of the one or more first rocket engines comprises:
determining when to fire propulsive rocket engines of the first space vehicle to achieve the first final destination orbit in the first final destination orbital plane; and
firing the propulsive rocket engines of the first space vehicle, at multiple times determined by the determining when to fire the propulsive rocket engines, to achieve the first final destination orbit in the first final destination orbital plane.

9. The method of claim 1, wherein the firing of the one or more second rocket engines of the second space vehicle to achieve the transfer orbit, comprises:
determining when to fire the one or more second rocket engines of the second space vehicle to achieve the transfer orbit; and
firing the one or more second rocket engines of the second space vehicle, at multiple times determined by the determining when to fire the one or more second rocket engines of the second space vehicle to achieve the transfer orbit.

10. The method of claim 1, wherein the firing of the one or more second rocket engines of the second space vehicle to achieve the second final destination orbit, comprises:
firing the one or more second rocket engines of the second space vehicle at multiple times determined by the determining when to fire the one or more second rocket engines of the second space vehicle to achieve the second final destination orbit.

11. The method of claim 1, wherein the determining the first orbit comprises:
determining the first orbit having the first perigee altitude and the first apogee altitude based on capabilities of the launch vehicle, capabilities of the second space vehicle, and the orbital regression rate appropriate for inserting the second space vehicle into the second final destination orbital plane.

12. The method of claim 1, wherein the first orbit is a low earth orbit.

13. The method of claim 1, further comprising:
releasing the first space vehicle from the launch vehicle, in the first orbit in the first final destination orbital plane.

14. The method of claim 2, wherein the determining of the first orbit is performed before the launching, and wherein the releasing of the first space vehicle is performed after the releasing of the second space vehicle and before completing the transferring of the second space vehicle to the second final destination orbital plane.

15. The method of claim 3, wherein the first orbit of the second space vehicle is elliptic, the transfer orbit of the second space vehicle is elliptic, and the second final destination orbit of the second space vehicle is circular,
wherein the second orbit of the first space vehicle is elliptic, and the first final destination orbit of the first space vehicle is circular,
wherein the first orbit is different from the second orbit,
wherein the first perigee altitude of the first orbit is the same as a perigee altitude of the transfer orbit,
wherein an apogee altitude of the transfer orbit is the same as an apogee altitude of the second final destination orbit, and wherein an apogee altitude of the second orbit is the same as an apogee altitude of the first final destination orbit.

16. The method of claim 1, wherein the second space vehicle has an ADS (attitude determination subsystem), and
wherein the performing, by the second space vehicle, its own mission comprises:
performing, by the second space vehicle, attitude determination utilizing the ADS.

17. The method of claim 1, wherein the second space vehicle has a communication module having TT&C (telemetry tracking & command) and C&DH (command and data handling), and
wherein the performing, by the second space vehicle, its own mission comprises:
performing, by the second space vehicle, telemetry tracking and command; and
performing, by the second space vehicle, command and data handling.

18. The method of claim 1, wherein the second space vehicle has an EC antenna (earth coverage antenna), and wherein the performing, by the second space vehicle, its own mission comprises:
performing, by the second space vehicle, communication utilizing an earth coverage antenna.

19. The method of claim 1, wherein the second space vehicle has NDS (nuclear detonation detection system) electronics, and wherein the performing, by the second space vehicle, its own mission comprises:
performing, by the second space vehicle, nuclear detonation detection.

20. The method of claim 1, wherein the second space vehicle has waveguides, and wherein the performing, by the second space vehicle, its own mission comprises utilizing waveguides.

* * * * *